Dec. 19, 1961 S. C. STRAUS 3,013,473
SWIVEL HEAD FOR MILLING MACHINES
Filed Sept. 13, 1956 7 Sheets-Sheet 1

INVENTOR.
S. Charles Straus,
BY
Wood, Herron & Evans.
ATTORNEYS.

Dec. 19, 1961  S. C. STRAUS  3,013,473
SWIVEL HEAD FOR MILLING MACHINES
Filed Sept. 13, 1956  7 Sheets-Sheet 2
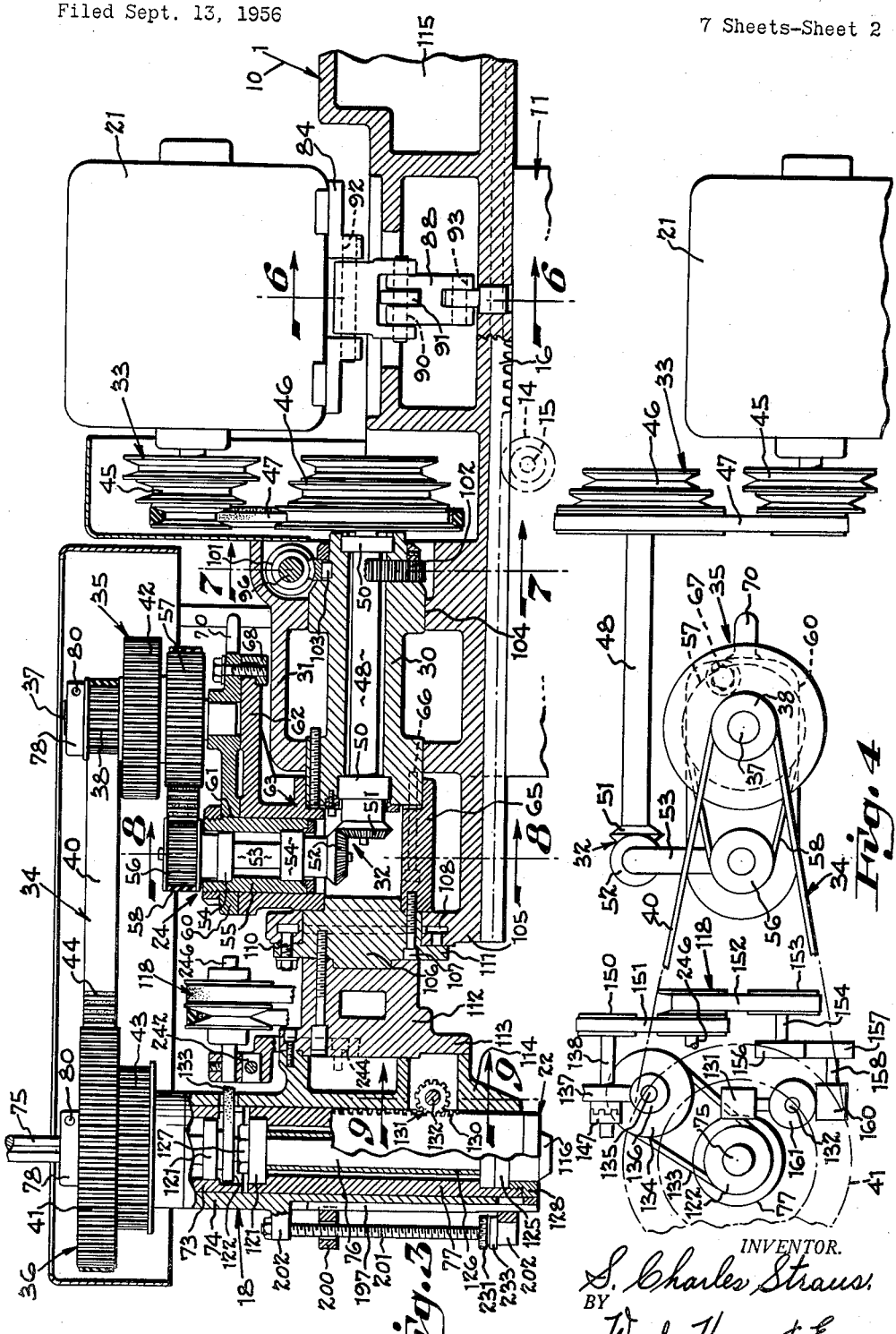
INVENTOR.
S. Charles Straus.
BY
Wood, Herron & Evans.
ATTORNEYS.

Dec. 19, 1961      S. C. STRAUS      3,013,473
SWIVEL HEAD FOR MILLING MACHINES

Filed Sept. 13, 1956      7 Sheets-Sheet 4

INVENTOR.
S. Charles Straus.
BY
Wood, Herron & Evans.
ATTORNEYS.

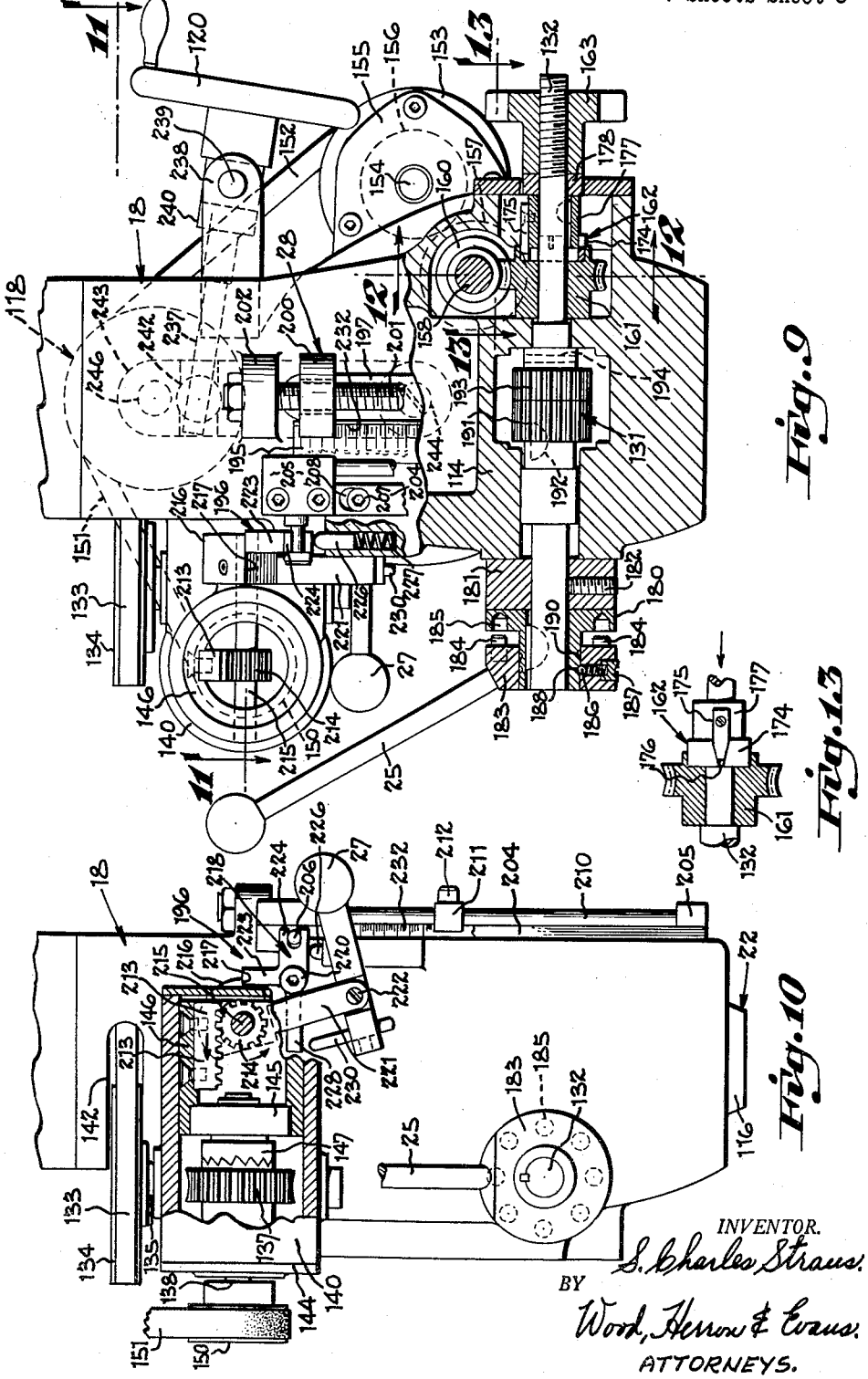

Dec. 19, 1961   S. C. STRAUS   3,013,473
SWIVEL HEAD FOR MILLING MACHINES
Filed Sept. 13, 1956                                7 Sheets-Sheet 6

INVENTOR.
S. Charles Straus.
BY
Wood, Herron & Evans.
ATTORNEYS.

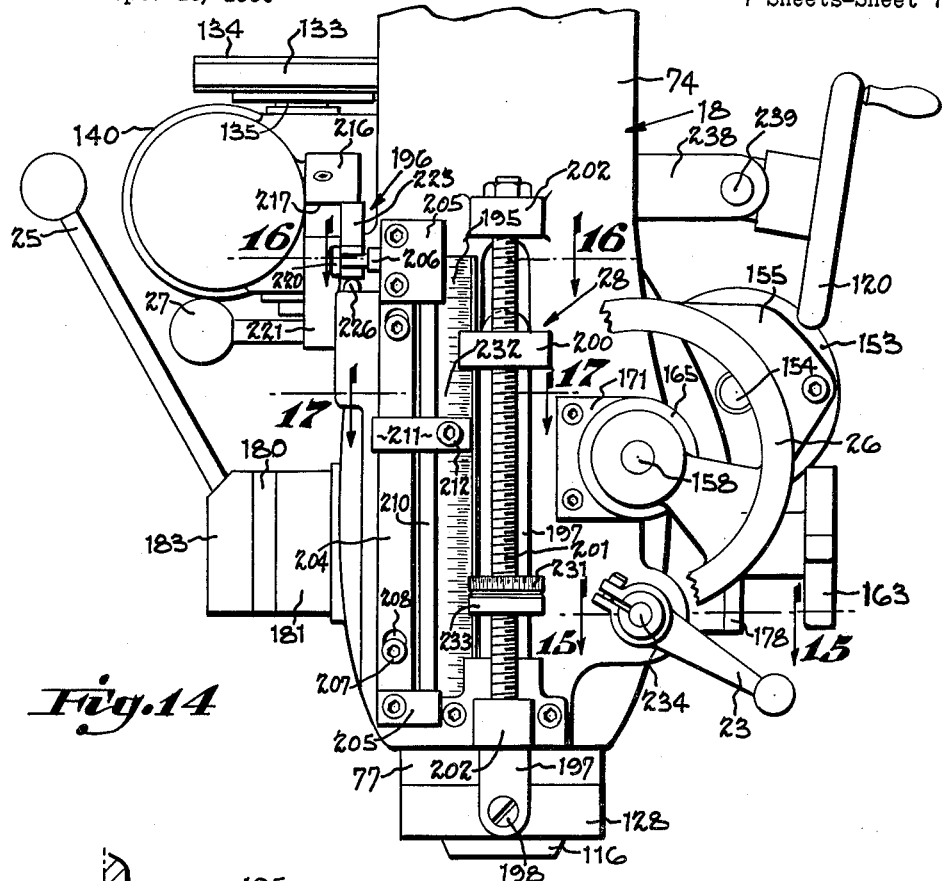

United States Patent Office 3,013,473
Patented Dec. 19, 1961

3,013,473
SWIVEL HEAD FOR MILLING MACHINES
S. Charles Straus, Cincinnati, Ohio, assignor to Cincinnati Manufacturing Corporation, Cincinnati, Ohio, a corporation of Ohio
Filed Sept. 13, 1956, Ser. No. 609,754
6 Claims. (Cl. 90—17)

This invention relates to a milling head for performing vertical and angular machining operations, such as surface milling, boring and the like.

The head structure of this application forms a part of a convertible milling machine which is used in horizontal milling operations, as disclosed in my co-pending application, Serial No. 607,137, filed on August 30, 1956, now Patent No. 2,963,944, issued December 13, 1960. In general, the machine of the co-pending application comprises a base or column, having an indexing turret movable about a vertical axis and journalling a horizontal tool spindle. The main motor of the machine drives the spindle and also reciprocates a work table slidably mounted on a knee at the front of the column. The horizontal spindle is used in horizontal milling operations, such as surface finishing, machining longitudinal grooves and slots, and for generating helical grooves. In these operations, the indexing turret is turned about its axis to present the horizontal spindle and its tool at the proper angular relationship with the workpiece carried on the table.

Conventional milling machines may be divided generally into two classes, the horizontal machine which is used in the horizontal milling operations, as outlined above, and the vertical machine which is used in vertical and angular machining operations. In order to adapt either type of machine to the horizontal and vertical operations, swivel heads have been supplied in the past as demountable attachments. However, such attachments do not provide the high degree of machine rigidity which is required for high quality, close tolerance cutting operations. Moreover, the conversion of the machine by the use of such attachments involves the added time and labor of handling and installing the attachment.

A principal objective of the present invention has been to provide a swivel mounted head for vertical operations, the head being mounted permanently on the convertible machine and arranged to cooperate with the components of the machine, utilizing the indexing turret for positioning the head with respect to the workpiece which is carried by the table.

The head structure of the present invention is permanently mounted upon an overarm which is carried by the indexing turret of the machine, the head residing at an end of the overarm opposite the horizontal tool spindle. The overarm is slidable horizontally upon the turret; hence, in converting the machine for vertical or angular cutting, the turret and overarm simply are rotated to bring the milling head in operating position above the table. The combined rotary and lineal adjustment provided by the turret and overarm, thus make it possible to position the head precisely above a point on the workpiece which is carried by the table. In addition, the vertical head includes a swivel mechanism by which it may be indexed about a horizontal axis with respect to the overarm upon which it is mounted. The swivel mechanism makes it possible to adjust the axis of the vertical head and its spindle to any desired angle, either at right angles to the plane of the workpiece for vertical milling, or at an angle less than a right angle for angular milling and boring operations.

In its right angular adjustment, the head may be used in longitudinal machining operations, such as surface milling and in milling longitudinal channels, grooves and the like utilizing the table of the machine to feed the workpiece longitudinally relative to the cutting tool. For angular operations, such as in boring and similar end cutting operations, the table usually supports the work in stationary position and the spindle of the vertical head is fed axially into the workpiece. In either type of operation, the vertical head, by virtue of its permanent mounting on the overarm, provides the inherent rigidity for precision cutting operations.

Another objective has been to provide a simple spindle transmission and power feed mechanism for the spindle of the vertical head. In its preferred form, the vertical head is driven by its own motor which is mounted directly upon the overarm and in driving connection with the spindle by a speed change belt drive. The spindle feed is obtained by a second belt drive system which is driven from the spindle and which includes a variable pitch pulley system in driving connection with the quill of the spindle for advancing the quill and spindle at infinitely variable feed rates.

A further objective has been to provide a direct reading depth control mechanism which precisely limits the depth of spindle feed in accordance with a direct reading scale. The depth scale is mounted directly on the head, and a trip mechanism is mounted adjacent the scale. The trip mechanism includes a stop dog which is slidable with respect to the scale which may be clamped in alignment with the scale graduations to denote the required depth. When the spindle is fed downwardly, a lug connected to the quill contacts the dog, causing the trip mechanism to disengage a clutch in the spindle feed drive so as to decommission the drive. To obtain maximum precision, a positive stop, in the form of a micrometer nut, is threaded upon a screw shaft adjacent the depth scale. The micrometer nut may be used either in setting the stop dog for automatic operation, or it may be used as a positive stop engaged by the lug of the quill under manual spindle feed.

Various other objects and advantages of the invention will be more fully apparent to those skilled in the art from the following description taken in conjunction with the drawings.

In the drawings:

FIGURE 3 is a general longitudinal section of the overarm and head assembly as viewed along line 3—3 of FIGURE 1.

FIGURE 4 is a diagrammatic view of the driving system for rotating and feeding the spindle, the driving components being projected from FIGURE 3.

FIGURE 9 is a fragmentary view taken along line 9—9 of FIGURE 3, showing a portion of the spindle depth control mechanism.

FIGURE 10 is a view partially in section detailing the trip mechanism for the clutch of the automatic spindle feed.

FIGURE 13 is a fragmentary sectional view taken along line 13—13 of FIGURE 9, further detailing the friction clutch which selectively provides coarse and fine spindle feed under manual control.

FIGURE 14 is a diagrammatic view of the depth control mechanism at the front of the head.

FIGURE 15 is a sectional view taken along line 15—15 of FIGURE 14, detailing the spindle clamp mechanism.

FIGURE 16 is a sectional view taken along line 16—16 of FIGURE 14, further detailing the depth control mechanism.

FIGURE 17 is a sectional view taken along line 17—17 of FIGURE 14, detailing the adjustable depth control stop arrangement.

*General arrangement of the overarm and vertical head*

Figure 1:
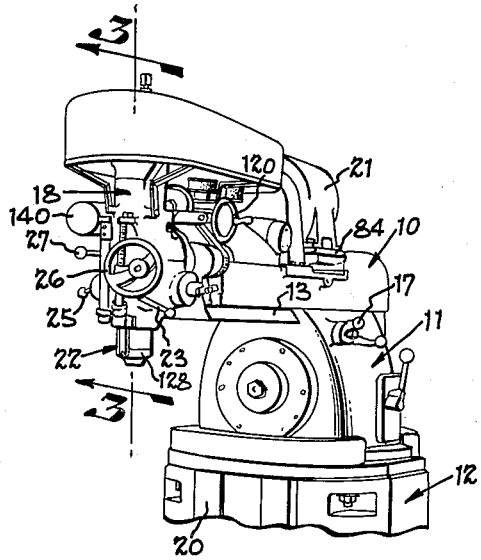
FIGURE 1 is a fragmentary perspective view showing the column and turret of the milling machine, with the overarm and swivel mounted milling head adjusted for a vertical milling operation.
Figure 2:
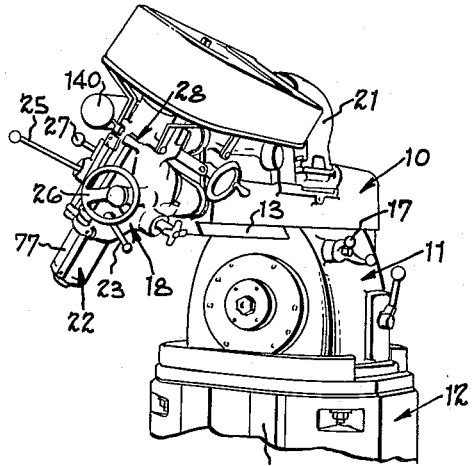
FIGURE 2 is a view similar to FIGURE 1, showing the head indexed or swivelled upon the overarm for an angular milling operation.

Described generally with reference to FIGURES 1 and 2, the overarm 10 is mounted for turning movement about a vertical axis upon the turret 11 carried by the column 12 of the milling machine. The structure of the milling machine and indexing turret are disclosed in the above noted co-pending application, Serial No. 607,137. Since the details of the milling machine and turret form no part of the present invention, they have been omitted from the disclosure.

As shown in FIGURES 1 and 2, the overarm includes a dovetail way 13 slidably engaged in the top of the turret 11. The overarm is shiftable lineally in a horizontal path above the turret by a pinion 15 (FIGURE 3) keyed to a cross shaft 15 journalled in the turret, the pinion meshing with a rack 16 attached to the bottom of the overarm. As shown in FIGURE 1, an overarm adjusting handle 17, in the form of a pair of arms, is keyed to the end of shaft 15, such that rotation of the handle shifts the overarm lineally upon the turret.

It is to be noted that the overarm 10 is used both in horizontal milling, as shown in the co-pending application and in vertical and angular milling, as shown in FIGURES 1 and 2 of the present invention. For this purpose, the vertical head 18 is carried upon one end of the overarm, as shown, and an outboard bearing (for horizontal milling) is carried upon its opposite end. The turret includes a horizontal spindle aligned with the outboard bearing for supporting the arbor of the milling cutters. The horizontal spindle is driven by the main motor (not shown) which is mounted in column 12.

During operation of the milling machine in horizontal operations, as disclosed in the co-pending application, the turret 11 and overarm 10 are swivelled to a position opposite from that shown in FIGURE 1, with the vertical head 18 in an inactive position at the rear of the machine. In the horizontal set-up, the overarm outboard bearing locates the cutting tool in working position above the table (not shown). The table is carried upon a knee and saddle structure mounted upon the vertical dovetail 20 which is shown in FIGURE 1. The table is reciprocated by the main motor of the machine.

The vertical head 18 of the present invention, is powered by its own motor 21 which is mounted upon the overarm (FIGURES 1 and 2). The vertical head is utilized for specialized work, both in milling operations and also for tapping, boring and the like. When set up as shown in FIGURES 1 and 2 the head overhangs the table; thus the table is utilized for feeding or supporting the work in the same manner as in the horizontal operations. It will be seen that the turret 11 also serves both in the horizontal and vertical operations. The combined radial and lineal adjustment of the overarm permits the vertical head 18 to be aligned precisely with a point on a workpiece carried by the table in the vertical and angular milling and machining operations.

As shown in FIGURE 1, the head is adjusted for vertical milling and depending upon the nature of the work, the vertical spindle 22 may be fed axially, or on the other hand, the spindle feed may be decommissioned and the work may be fed longitudinally by the table relative to the rotating vertical spindle for longitudinal cutting. When the spindle feed is not used, the spindle is clamped against axial motion by a clamp lever 23 (FIGURES 1 and 15). In this instance, the main motor may be operated for the table feed, while the head motor 21 drives the spindle of the vertical head.

Figure 8:
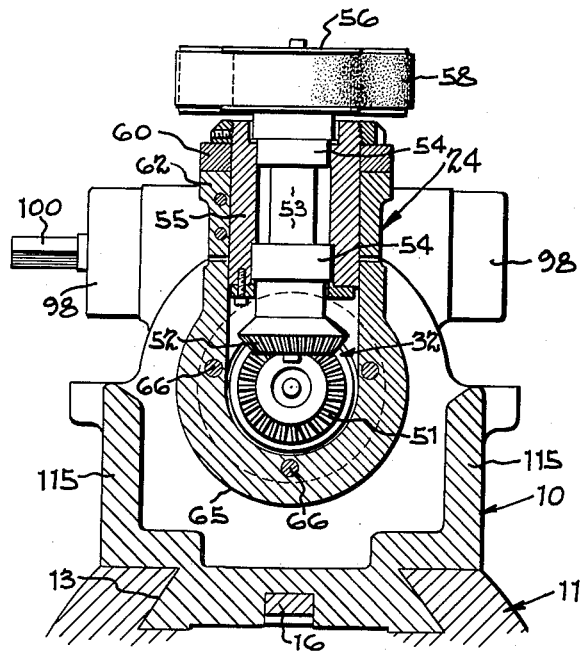
FIGURE 8 is a view taken along line 8—8 of FIGURE 3, showing the centralized bevel gear drive of the head indexing or swivel mechanism.

When the machine is set up for angular milling as shown in FIGURE 2, the head is swivelled about a horizontal axis relative to the overarm by a head swivel mechanism 24 (FIGURE 8). In the angular milling operations (FIGURE 2), the vertical spindle 22 usually is fed axially into the work with the table and workpiece stationary; however, in some cases, the angular milling operation may be also carried out with the table feeding for longitudinal cuts with the spindle feed decommissioned.

As described later, the vertical spindle 22 may be fed either by hand or by power; hand feeding being accomplished either with coarse feed lever 25 or with fine feed hand wheel 26 (FIGURE 14). Power spindle feed is initiated by a power feed lever 27 (FIGURE 14); this lever commissions a depth control mechanism, indicated generally at 28 in FIGURE 14, which stops the power feed at a predetermined depth. The depth control mechanism includes micrometer adjusting means for precise control of the depth to be machined.

*Overarm structure and head drive*

Referring to FIGURE 3, the overarm 10 is of box-like construction for rigidity, and the head 18 is mounted for swivelling motion about a horizontal axis by means of a swivel spool 30 journalled in a central housing 31 of the overarm. To obtain the swivel head motion without interfering with the spindle drive, the drive from head motor 21 is by way of the centralized bevel gear drive 32 which is coaxial with the swivel spool 30. In general, the motor drives through a V-belt pulley system 33 to the bevel gear drive and is completed to the spindle by way of a timing gear and belt drive indicated generally at 34. As explained later in detail, the motor pulley drive and timing belt drive, in combination, provide nine spindle speeds, the timing belt drive providing three speed ranges and the motor pulley drive providing three different speeds in each of the three ranges. In the present example, the two drives provide spindle speeds ranging from 63 r.p.m. to 2100 r.p.m.

To obtain the three ranges with the timer belt drive 34, two sets of timing gears are utilized, the driving gear set indicated at 35, and the driven gear set at 36. The set of driving gears 35 is journalled on a stub shaft 37 and the driven set 36 is mounted on the head 18. In the low speed range shown in FIGURE 3, the small driving gear 38 is connected by a timing belt 40 with the large driven gear 41 of the head. In the intermediate range, the timing belt is shifted to the two gears 42 and 43 which provide a one-to-one ratio. For the high speed range, the large gear 41 and small gear 38 are interchanged in position, such that large gear 41 is mounted on the stub shaft 37, and in driving connection with the small gear 38 which is now mounted upon the head. The timing belt 40 is of conventional design and is formed of pliable material which includes teeth 44 meshing with the teeth of the timing gears to provide a positive driving connection.

The three-speed motor pulley drive 33 comprises the three speed stepped motor pulley 45 keyed to shaft of the motor and in driving connection with a stepped driven pulley 46 by means of a V-belt 47. The driven pulley 46 is keyed to the centralized drive shaft 48, which is journalled upon ball bearings 50 mounted in the central bore of the swivel spool or sleeve 30. A bevel gear 51 is keyed to the inner end of the centralized shaft and meshes with a companion bevel gear 52 keyed to the right angular counter shaft 53 which is carried on ball bearings 54 seated in a bearing cage 55.

Keyed to counter shaft 53 is a small timing gear 56 in driving connection with a driven timing gear 57 through a timing belt 58. The driven timing gear 57 is journalled on the stub shaft 37 and is keyed to the set of driven gears 38 and 42, as explained later.

Figure 5:
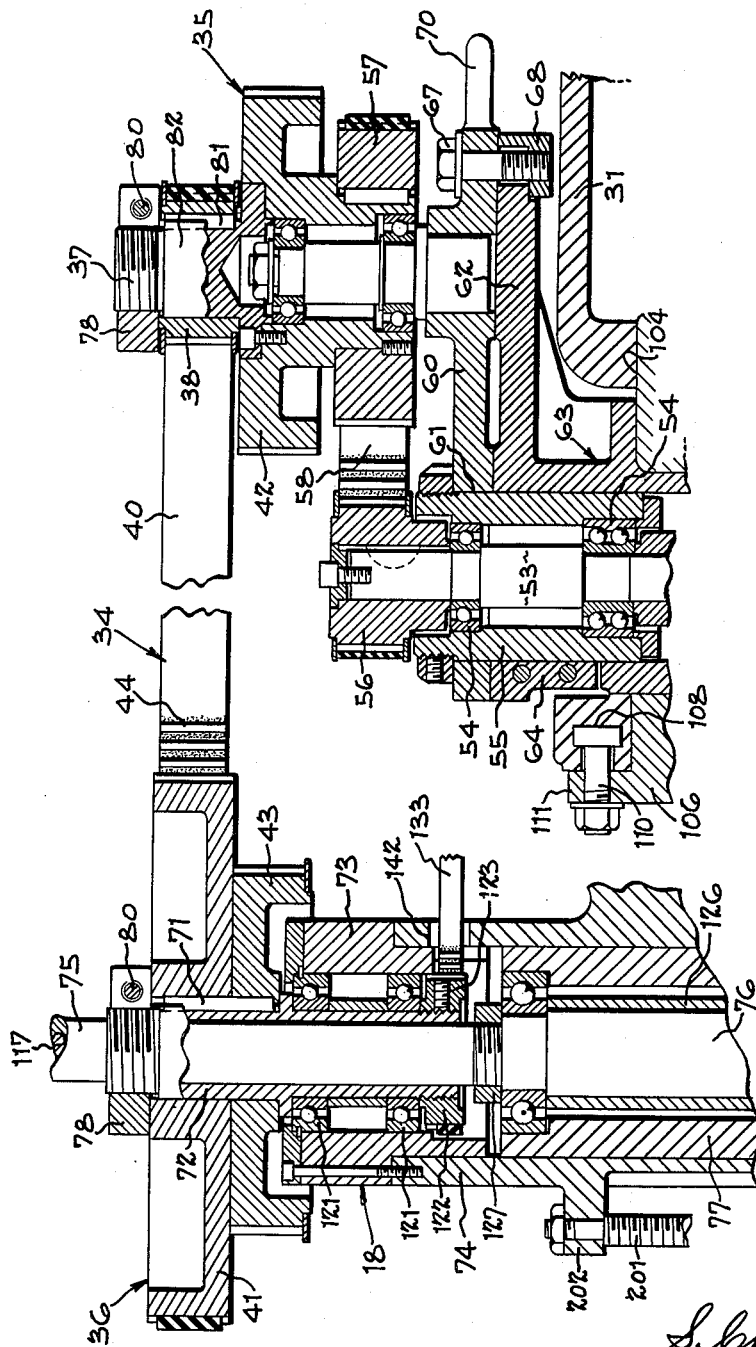
FIGURE 5 is an enlarged sectional view taken from FIGURE 3, illustrating the interchangeable driving gear and belt system of the spindle.

Referring to FIGURES 3, 4, and 5, stub shaft 37, which journals the driving gear assembly 35, is carried by a shiftable sector plate 60. In order to shift the main drive belt 40 to change the spindle range, the sector plate is journalled as at 61 upon cage 55 which carries the counter shaft 53. The sector plate shifts relative to a stationary sector 62, which forms a part of a swivel bracket 63. Counter shaft cage 55 is fitted in an external sleeve 64 of swivel bracket 63. The swivel bracket 63 further includes a right angular hub 65 attached by screws 66 to the inner end of the swivel spool 30.

The swinging sector 60 is clamped in adjusted position by a screw 67 threaded through a clamping lug 68 engaging the edge portion of the stationary sector plate. When the clamping screw is loosened, the swing sector and the driving gears mounted upon it, it may be swung by its handle 70 in an arc toward the driven gears 36 of the head, allowing the main timing belt 40 to be shifted from one set of timing gears to the other set. In shifting the sector and its gears, stub shaft 37 and its driven gears swing concentrically about the small timer gear 56; therefore, the tension of the intermediate timing belt 58 is not changed. After the main belt 40 is shifted for the change in speed range, the swinging sector 60 is shifted back to its original position to pull the belt taut; thereafter, it is clamped in position by tightening the screw 67.

Referring to FIGURE 5, the driven gears 36 of the head are keyed in common as at 71 to a driving sleeve 72 which is rotatably journalled in a bearing cage 73 seated in the bore of the spindle housing. The spindle shaft 75 is slidably keyed to driving sleeve 72 to rotate the spindle 76 which is axially movable within the spindle quill 77. As shown, large driven gear 41 rests directly upon the companion gear 43 beneath it, and is held in position by a threaded collar 78 screwed upon the threaded upper end of the driving sleeve 72. Threaded collar 78 is split and is locked in place by a set screw 80.

The small driving gear 38 (FIGURE 5) is keyed as at 81 upon a stud 82 permanently attached to the large driving gear 42. Stud 82 includes a threaded end portion having a threaded collar 78 screw thereon to retain the small gear in position. This collar likewise is split and clamped in place by a set screw 80.

As noted earlier, the third high speed range is obtained by transposing the large and small gears 38 and 41. This is done by removing their threaded collars 78 for removal of the gears. To permit interchange, the driving sleeve 72 and stud 82 have equal diameters and duplicate key ways.

Figure 6:
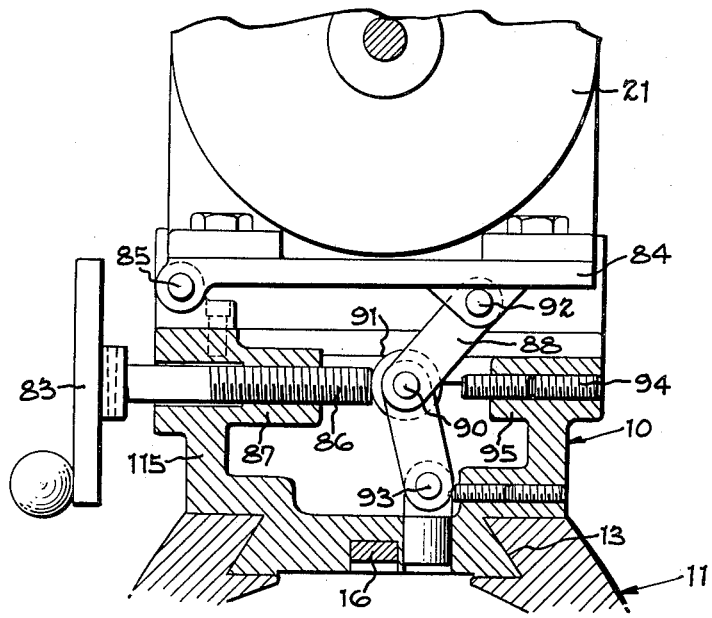
FIGURE 6 is a sectional view taken along line 6—6 of FIGURE 3, illustrating the adjustable mounting of the spindle motor.

To facilitate shifting the V-belt 47 of the motor drive, the motor and its stepped pulley 45 may be shifted conveniently by a hand wheel 83 (FIGURE 6). As shown, the motor is bolted to a mounting plate 84 which has one end pivoted as at 85 to the overarm. The hand wheel 83 is mounted upon a threaded shaft 86 passing through the threaded bore of a boss 87 forming a part of the overarm. A pair of toggle levers 88 have their intermediate ends pivotally connected as at 90 and a ball bearing assembly 91 of the intermediate pivot is engaged by the inner end of the screw shaft 86. The upper end of one of the levers includes a pivot pin 92 engaged in the swinging portion of mounting plate 84. The lower end of the companion toggle lever is pivoted as at 93 to the overarm. As shown in FIGURE 3, the ball bearing is located at the vertical center of the toggle links, the links being approximately forked and interfitted to balance the load. When the hand wheel 83 is rotated in a direction to feed the screw shaft outwardly, the toggle links, by a scissors action, allow the mounting plate and motor to swing downwardly and to loosen V-belt 47. The belt is then disengaged from the pulleys and repositioned for the required speed; thereafter, the hand wheel is rotated in the opposite direction, causing a screw and toggle to raise the motor and tighten the belt. As shown in FIGURE 6, a stop screw 94 is threaded through a boss 95 of the overarm opposite the screw shaft 86 and may be adjusted to limit the toggle motion.

The head driving system is shown in its lowest speed in FIGURE 3, the V-belt driving from the smallest motor pulley step to the largest driven pulley step. The nine spindle speeds are obtained by the three speed ranges of the timer belt drive, described above, in combination with the three speeds which are obtained by the motor pulley system.

Head swivelling mechanism

As noted earlier, the head may be swivelled to any desired angle without interfering with the driving system, since bevel gear 52 of counter shaft 53 is free to move in an orbit around bevel gear 51 as the head assembly is swivelled. Described in detail (FIGURES 3 and 7), the head is swivelled by rotating an indexing shaft 96, journalled on ball bearings 97 carried by bearing caps 98 attached to the opposite sides of the overarm. Shaft 96 includes an outwardly projecting squared end 100 for engagement by a hand wheel or similar tool. A worm 101 is keyed to shaft 96 and meshes with a ring-shaped worm wheel 102 keyed as at 103 to the swivel spool 30. Rotation of the indexing shaft thus imparts turning motion to the swivel spool. As shown in FIGURE 3, the worm wheel is closed in place by a retainer ring threaded upon the end portion of the swivel spool and bearing against the ring gear.

The swivel sleeve includes concentric journals 104 rotatably carried in the bores of the central housing 31 of the overarm. As noted earlier, the swivel bracket 63 is secured by the screws 66 to the end of the swivel spool and turns as a unit with the spool.

To support the head for swivel motion, the outer end of the overarm has a vertical bearing wall 105 rotatably supporting an intermediate bearing block 106 which is attached by screws 107 to hub 65 of the swivel bracket (FIGURE 3). The intermediate bearing block rotatably interfits the bore of the bearing wall for turning movement on an axis common to the central drive shaft 48. The bearing wall further includes a circular T-slot 108 traversed by T-screws 110 passing through the flange 111 of the intermediate bearing block 106. The T-screws include nuts which, when tightened, clamp the bearing block rigidly into the overarm. The circular T-slot is concentric with axis of central shaft 48, and when the nuts are loosened, the intermediate bearing block, being secured to the swivel assembly, rotates as a unit with the swivel spool. The periphery of flange 111 preferably is provided with graduations (not shown) indicating the degrees of rotation relative to a reference mark on the overarm.

The spindle housing 74 is supported on the intermediate bearing block 106 by a spacer block 112 secured by screws to the bearing block. The spacer block includes a flange 113 which is secured by screws to a box-like housing 114 forming a part of the spindle housing.

Figure 7:
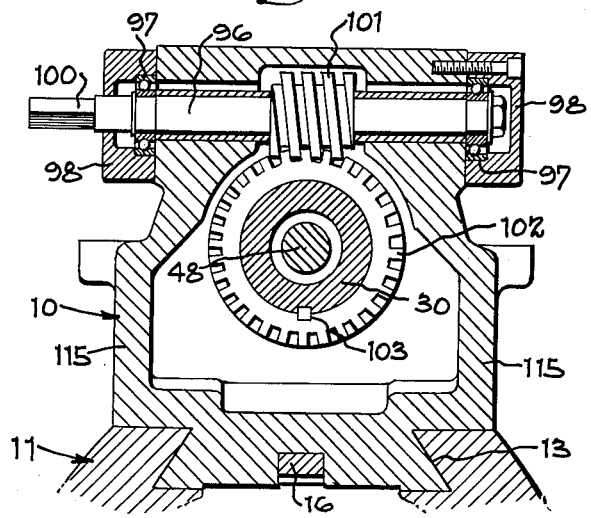
FIGURE 7 is a sectional view through the head swivel mechanism taken along line 7—7 of FIGURE 3.

After the head has been indexed or swivelled to the required angle, the nuts of the T-screws are tightened to lock the entire assembly rigidly to the bearing wall 105 of the overarm. Referring to FIGURES 7 and 8, the overarm box section includes side walls 115 which join the bearing wall 105 to provide rigidity. In clamped position, the forces developed as the spindle is fed into the work are resisted directly by the box section of the overarm.

Power spindle feed mechanism

Figure 11:
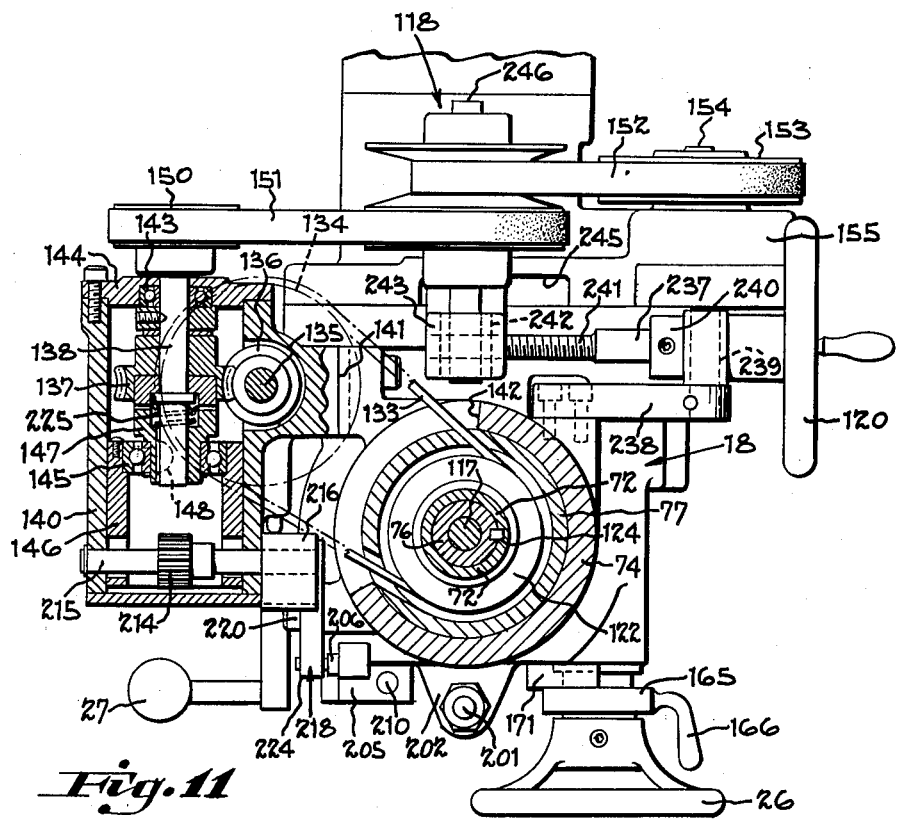
FIGURE 11 is a fragmentary sectional view taken along line 11—11 of FIGURE 9, further detailing the trip mechanism of the automatic spindle feed.

The spindle 76 includes a nose portion 116 at its lower end in which the tool is detachably mounted, the tool having a collet engaged in a tapered bore in the nose. The tool is engaged by a draw bar 117 in the usual manner (FIGURE 11). As noted earlier, various types of tools depending upon the desired operation, are mounted in the spindle. For example, in milling a flat surface on the workpiece, a face milling cutter is used, having cutting teeth which face downwardly. In this operation, the spindle is rotated but is clamped against axial feed motion (the feed mechanism being decommissioned) the cut being obtained by feeding the table horizontally with respect to the rotating cutter. In this operation, the head may be swivelled to a vertical position.

The same procedure is utilized in machining longitudinal channels, slots and the like, the shape of the milling cutter being dictated by the configuration of the slot or channel. In some instances, where curved or circular slots are required, the same set-up is utilized but the work is mounted upon a fixture which adapts it to be rotated relative to the milling cutter. In this case, the table naturally remains stationary during the cutting operation.

In other milling operations, which involve the machining of face configurations or bores in the workpiece, a suitable end cutting or boring tool is mounted in the spindle and the spindle is fed axially into the workpiece which is held in stationary position by the table. In these operations, the work may require the spindle to be fed either in right angles into the plane of the work or it may be required that the spindle is fed axially at less than a right angle. In these angular operations, the head is swivelled to set the spindle at the required angle.

In many operations involving axial spindle feed, the spindle is fed axially by power at a rate which is related to the spindle speed. In the present example, spindle feed is selective from .002" to .008" per revolution, the feed being infinitely variable by means of variable pitch V-belt drive indicated generally at 118 (FIGURE 4) which is adjusted by a hand wheel 120 (FIGURE 11). The spindle feed system is shown diagrammatically in FIGURE 4, the power being derived from the rotating spindle and applied to the axially movable quill 77 under control of the variable pitch pulley drive 118.

Referring to FIGURE 5, the spindle driving sleeve 72, previously noted, is rotatably journalled on ball bearings 121 carried in the bearing sleeve or cage 73 attached to the upper end of the spindle housing. A timing gear 122, keyed by screw 123 to the lower end of the driving sleeve, drives the spindle feed mechanism. The spindle shaft 75 is slidably keyed as at 124 for axial motion with respect to the driving sleeve 72 (FIGURE 11). The shank portion 76 of the spindle, which includes nose 116, is journalled in ball bearings 125 which are carried by the axially movable quill 77. A sleeve 126 surrounding shank 76 spaces the spindle bearings, the inner race of the upper bearing being engaged by a retainer ring 127 (FIGURE 5) threaded on the spindle shaft, the outer race of the lower bearing being engaged by a retainer ring 128 (FIGURE 3) threaded into the lower end of the quill. The retainers are adjusted to take up looseness, thereby to provide a precise running fit for the spindle in the quill. As shown in FIGURE 3, the intermediate portion of the quill is provided with rack teeth 130 engaged by a feed pinion 131 keyed to a feed shaft 132 journalled in the spindle housing. This shaft is rotated by the power spindle feed (controlled by hand lever 27, FIGURE 14) or it may be rotated manually by hand lever 25 or by hand wheel 26, depending upon the dictates of the work.

When the spindle is fed by power (FIGURE 4), the feed drive to the quill and spindle is by way timing gear 122 (driving sleeve 72), belt 133 to a companion gear 134 of counter shaft 135. Counter shaft 135 includes a worm 136 meshing with a worm wheel 137 which is carried on a horizontal worm wheel shaft 138. Shafts 135 and 138 are journalled in an external cylindrical housing 140 which is bolted to a flange 141 (FIGURE 11), projecting from the spindle housing. As shown in FIGURES 10 and 11, timer belt 133 projects through a slot 142 formed in the spindle housing.

As shown in FIGURE 11, the outer ball bearing 143 of the horizontal shaft 138 is carried by a cover plate 144 bolted to housing 140, while the inner ball bearing 145 is carried in a sleeve 146 which is slidable axially within housing 140. A slidable depth control clutch 147 is keyed as at 148 to shaft 138. When engaged, as shown in FIGURES 10 and 11, the clutch 147 completes the drive from worm wheel 137 to shaft 138. As described later, the collar 147 may be disengaged to decommission the power feed either by hand lever 27 or by an automatic depth control mechanism as described later.

Assuming the depth control clutch 147 is to be engaged (FIGURE 4), the drive is by way of a V-belt pulley 150 keyed to the outer end of shaft 138 and connected by a V-belt 151 to the variable pitch pulley assembly 118 which is adjusted by the feed control hand wheel 120. The variable pitch pulley assembly is a commercial product and it has not been disclosed in detail. It will be understood however, that the assembly is shiftable to the right or left as viewed in FIGURE 11 to increase or decrease the feed rate. In the left hand position shown, the assembly is adjusted to its lowest spindle feed rate. Upon being shifted toward the right, by operation of hand wheel 120, the feed rate is increased.

As shown in FIGURES 9 and 11, hand wheel 120, which controls the feed rate, is keyed to a shaft 237 journalled upon an arm 238 of the spindle housing. The shaft 237 passes through a trunnion 239 of arm 238 locked against axial motion by the hub of the hand wheel and a collar 240 engaged against opposite sides of trunnion 239. The inner portion of the shaft is threaded as at 241 and passes through a swivel nut 242 journalled in an arm 243. The lower end of arm 243 is pivotally connected as at 244 to the spindle housing, and its intermediate portion passes through a slot 245 in the spindle housing. The idler shaft 246 of the variable pitch pulley assembly is attached to the swinging upper end of the arm 243. Rotation of hand wheel 120 thus shifts the pulley assembly to the right or left to change its pitch.

The variable pitch pulley assembly 118 includes a second V-belt 152 passing around a V-belt pulley 153 keyed to shaft 154. Shaft 154 is journalled (FIGURE 9) in a gear housing 155 of the spindle housing and includes a gear 156 meshing with a driven gear 157 keyed to cross shaft 158.

Figure 12:
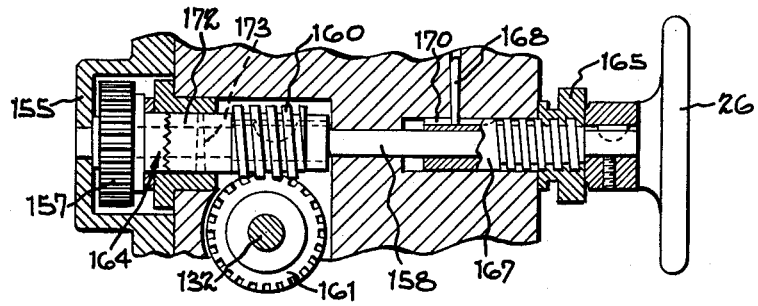
FIGURE 12 is a fragmentary sectional view taken along line 12—12 of FIGURE 9, detailing the fine feed mechanism for the spindle.

As shown in FIGURES 9 and 12, cross shaft 158 includes worm 160 meshing with a worm wheel 161 carried upon the feed shaft 132 previously noted, which includes the pinion 131 engaging the rack teeth of the quill. A hand-operated friction clutch, indicated generally at 162 in FIGURE 9, provides a driving connection from the worm wheel 161 to the feed shaft 132. As explained later, clutch 162 may be disengaged by operation of knob 163 to permit manual feeding of the quill and spindle with the coarse feed hand lever 25.

Briefly, when depth control clutch 147 is engaged and friction clutch 162 is also engaged, the spindle will be fed automatically until clutch 147 is tripped to a disengaged position by the automatic depth control mechanism as explained later. The power feed drive, as best shown in FIGURE 4, therefore is by way of depth control clutch 147 to the variable pitch pulley assembly 118, and is completed by V-belt pulley 153 through the gears 156 and 157 to the worm 160 and worm wheel 161. The worm wheel drives feed shaft 132, previously noted, which includes the pinion 131 meshing with the rack teeth of the quill. Accordingly, the quill and spindle will continue feeding downwardly until the depth control mechanism trips the depth control clutch to its disengaged position.

*Hand spindle feed*

The quill and spindle may be fed manually either by way of the feed lever 25 (FIGURE 9) for rapid feed or by a hand wheel 26 for fine feed. For hand feeding (either coarse or fine) the drive from gear 157 to worm 160 includes a toothed clutch 164 (FIGURE 12) which is disengaged manually by rotating a collar 165 having a handle 166 as shown in FIGURE 11. The clutch is shown engaged in FIGURE 12 and is disengaged by rotation of collar 165. As shown in FIGURE 12, worm shaft 158 includes a threaded sleeve 167 which is slidable axially in a bore formed in the spindle housing. A pin 168 engaging a slot 170 prevents rotation of the threaded sleeve. The clutch control collar 165 is threaded upon the sleeve and is confined against axial motion by a fixed yoke 171 engaging a groove of the collar.

Rotation of the collar 165 in clutch disengaging direction shifts worm wheel shaft 158 toward the right as viewed in FIGURE 12. The clutch element 172 is pinned as at 173 to the shaft. The gear 157 which drives worm 160 is loosely journalled upon a worm shaft 158 and is confined against axial motion. Therefore, when worm shaft 158 has been shifted toward the right, the clutch is disengaged and the driving gear 157 is free to rotate upon the worm shaft, the power drive being disconnected. In this position, spindle feed is placed under the control of feed lever 25 or fine feed hand wheel 26.

*Manual coarse feed*

The coarse feed mechanism is best disclosed with reference to FIGURE 9. When set for coarse feed, it is also necessary to disengage the friction clutch 162. This clutch allows the spindle to be fed under power against a positive stop without straining the driving system and also permits the coarse feed rotation of shaft 132. The friction clutch provides a slipping action, allowing the worm wheel to rotate even though the spindle is run up against a positive depth stop with the power drive operating.

As shown in FIGURES 9, 12 and 13, the friction clutch 162 comprises an expansion ring 174 fitted into a cylindrical bore in the final drive worm wheel 161. The expansion ring is expanded by a wedge bar 175 slidably interfitting a split portion 176 of the expansion ring. The split portion corresponds in shape to the tapered end portion of the wedge bar and is thus expanded within its bore when the wedge bar is shifted toward the left as indicated in FIGURE 13. Upon being expanded, the ring establishes a frictional engagement within the bore of the worm wheel. The drive is completed from the expansion ring to the feed shaft by way of the wedge bar to a sleeve 177 to which the bar is attached. The sleeve in turn is slidably keyed to the feed shaft.

The friction clutch is controlled by the knob 163 threaded upon the outer portion of the feed shaft and in endwise engagement with the friction clutch sleeve 177 through a thrust washer 178. Rotation of the knob in clutch engaging direction thus forces the clutch sleeve and wedge bar 175 toward the right to expand ring 174. When knob 163 is unscrewed to disengage the clutch, it shifts toward the right as viewed in FIGURE 9, releasing the endwise pressure upon the clutch collar and allowing the expansion ring to contract. This allows worm wheel 161 to rotate freely upon the feed shaft. The quill and spindle are now free to be fed manually by operation of lever 25.

As shown in FIGURE 9, the manual feed lever is engageable with a driving sleeve 180 keyed to the left end of feed shaft 132. A collar 181, interposed between the spindle housing and driving sleeve, is secured by a set screw 182 to the shaft to lock the shaft against endwise motion. The feed lever 25 is intended primarily for production operations, utilizing a positive depth control stop as explained later, such that the spindle may be fed to the same depth upon successive workpieces. For the convenience of the operator, the manual lever may be selectively rotated to an angle best suited for a given operation, then engaged within the driving collar.

For this purpose, the feed lever includes a hub 183 rotatably journalled upon driving sleeve 180 and includes one or more driving pins 184 which may selectively be engaged in series of spaced apertures 185 formed in the driving sleeve. The hub 183 is shown disengaged in FIGURE 9 and is latched in this position by a spring loaded detent ball 186 having a spring seated against a plug 187 screwed into the hub. The detent ball engages an annular groove 188 formed in the driving sleeve.

In this position, the feed lever may be rotated freely to the required operating angle. When adjusted to the operating angle, the hub is forced toward the right, as viewed in FIGURE 9, to engage the pins 184 with the selected apertures 185, thus establishing the driving connection from lever hub to the driving sleeve which is keyed to the feed shaft. In this position, the detent ball 186 engages a second groove 190 to latch the hub in its engaged position. Since the friction clutch 162 is disengaged, the feed shaft 132 is free to rotate as the lever is operated to raise or lower the quill and spindle.

*Manual fine feed*

For fine spindle feed, the friction clutch 162 (FIGURE 9) is engaged and hand lever 25 may be disengaged as shown. The worm clutch 164 (FIGURE 12) is disengaged as previously described, allowing the worm 160 to be rotated by means of fine feed hand wheel 26 which is keyed to the worm shaft 158. Rotation of worm 160 thus drives the feed shaft 132 and pinion 131 at a fine feed rate through the friction clutch 162.

As shown in FIGURE 9, the quill pinion 131 is made in two sections in order to take up backlash in the drive from the pinion to the quill. In assembling the machine, the drive section 191 of the pinion is keyed as at 192 to the feed shaft, then the backlash section 193 is rotated to eliminate the backlash. Thereafter, a hole is drilled through the hub of the backlash section and a tapered pin 194 is driven into the hole.

The manual fine feed may be used in setting up the machine to a given depth for subsequent automatic operation under control of the depth control apparatus 28. It may also be used in production operations, using a positive stop to limit downward spindle feed, as described below.

*Depth control apparatus*

As best shown in FIGURES 9, 10 and 14, the depth control apparatus 28 is arranged to trip the depth control clutch 147 at a preselected depth as determined by a graduated scale 195 mounted at the front of the spindle housing. The depth control clutch is disengaged by a trip mechanism 196 (FIGURE 10), which is connected to the depth control apparatus.

Described in detail, the apparatus for shifting the depth control clutch 147 comprises a slide bar 197 attached as at 198 (FIGURE 14) to the retaining ring 128 at the lower end of quill 77 and slidable in a slot formed in the spindle housing. A trip lug 200 is attached to the upper end of slide bar 198 (FIGURE 16). A stationary screw shaft 201, fixed to lugs 202, is loosely traversed by the trip lug 200, the lug having an enlarged bore 203 for movement along the screw shaft. When the spindle is in retracted position, the trip lug 200 resides at the top of scale 195.

The clutch tripping mechanism 196 comprises a trip bar 204 slidably mounted in a slot formed in the spindle housing parallel with the graduated scale 195. The upper and lower ends of trip bar 204 include blocks 205 attached by screws, the upper block including a pin 206 connected to the clutch trip mechanism 196. The longitudinal movement of trip bar 204 (and its block 205) is limited by the screws 207 traversing the elongated slots 208 of the trip bar. A rod 210 is mounted between the upper and lower blocks 205 of the trip bar. A depth selector dog 211 is slidably mounted on rod 210 and includes a split portion traversed by a clamping screw 212 for locking it in a selected position on the rod. The selector dog (FIGURE 17) projects across the front of the scale for direct reading and is engageable by the trip lug 200 of slide bar 197. In setting up for a given depth, the depth selector dog 211 is shifted along rod 210 clamped in alignment with the graduation of the scale which delineates the required depth. As the quill and spindle are fed downwardly, the trip lug engages the projecting portion of the selector dog and shifts the dog and the trip bar assembly downwardly causing disengagement of clutch 147 through operation of pin 206 which actuates trip mechanism 196.

Referring to FIGURES 9 to 11, the trip mechanism is connected to sleeve 146 of the depth control clutch by a rack 213 meshing with a pinion 214 keyed to cross shaft 215 in cylindrical housing 140. The pinion is latched in the clutch engaging position of FIGURE 10 by a latch sector 216 keyed to shaft 215, the sector having a notch 217 engaged by a latch element 218 pivotally connected as at 220 to the spindle housing. A lever arm 221 depending from the latch sector includes the power feed lever 27, which is pivotally connected as at 222 to the lever arm. Upward motion of hand lever 27 rotates pinion 214 in the direction indicated, engaging depth control clutch 147, and causing the trigger arm 223 of latch element to engage notch 217 of the latch sector 216.

After the machine is placed in operation, the quill and spindle descent under power feed until the trip dog 211 is engaged by trip lug 200 at the preset limit. As shown in FIGURE 10, the pin 206 of block 205 interfits the forked end 224 of latch element 218, such that the downward motion of the pin swings trigger arm 223 outwardly to disengage notch 217, causing clutch disengagement. To facilitate prompt disengagement, a spring 225 (FIGURE 11) is placed under compression between the worm wheel 137 and clutch 147. The latch element 218 normally is urged upwardly in latch-engaging direction by a plunger 226 forced upwardly by the compression spring 227, as shown in FIGURE 9.

In order to release the latch element manually, the latch element includes a release arm 228 which is engaged by a pin 230 projecting upwardly from the end of hand lever 27. Downward movement of the hand lever forces the pin against the release arm and thus swings the trigger arm 223 outwardly in clutch-disengaging direction.

The scale 195 preferably is graduated in tenths of an inch. In order to provide micrometer adjustment, a micrometer nut 231, which is graduated preferably in thousandths of an inch, is screwed upon the threaded shaft 201. The lead of shaft 201 is such that one full turn of nut 231 shifts the nut one-tenth of an inch so that the nut sub-divides the scale of graduations in thousandths. In setting up the machine for precision depth control, the micrometer nut may be adjusted to the top plane of the trip dog 211 so as to provide the micrometer adjustment in combination with the graduations. In making the setting, the quill may be lowered to place its trip lug 200 in contact with the surface of the trip dog and micrometer screw. For automatic stopping, the micrometer nut may be lowered after it is used in locating the trip dog to allow tripping movement. It will be understood that allowance is made for the downward motion required to release the latch element in making this setting. The graduations of the micrometer nut may be read with reference to the right angular flange 232 of the graduated scale as shown in FIGURE 17.

The micrometer nut may also be used as a positive spindle stop in hand operations utilizing the fine feed hand wheel 26 or coarse feed lever 25. In this case, the spindle simply is fed downwardly until the trip lug 200 engages the micrometer nut. Using the nut as a positive stop in this manner, adapts the machine to rapid production operations under hand control. In this case, the micrometer nut may be locked in adjusted position by the lock nut 233 threaded on shaft 201 below it. The micrometer nut may also be used as a positive stop under power spindle feed in certain cases which require exceptional depth precision. In this event, the friction clutch 162 slips when the stop is engaged, with no damage or wear being imposed upon the feed mechanism.

When the vertical head is set up for longitudinal milling, such as surface finishing and the like, the work is reciprocated by the table and the spindle feed is decommissioned. In this instance, the quill is clamped against axial motion by the clamp lever 23.

As shown in FIGURE 15, the clamp comprises a screw shaft 234 attached to clamp lever 23 and having right and left hand screw threads. Respective opposed clamping shoes 235 are threaded on the right and left hand portions of the screw shaft and their opposed inner portions are machined to a curvature corresponding to the circumference of the quill. The screw shaft resides along a line generally tangent to the quill. When the clamping lever is rotated in clamping direction, the opposed shoes are forced into wedging engagement with the quill, the clamping force acting from opposite directions so that the force of one shoe is at least partially neutralized by the opposed shoe. A spring 236 is under compression between the inner ends of the shoes to force them apart when the lever is swung to unclamping position. When unclamped, the shoes offer no resistance to axial quill feeding motion.

Having described my invention, I claim:

1. A milling head structure for a milling machine having an overarm, said head structure comprising, a spindle housing, a tool spindle journalled in said housing, swivel means mounting said housing on said overarm, said swivel means providing rotary indexing motion of the spindle about an axis at right angles to the axis of the spindle, a centralized drive shaft journalled in said swivel means upon said axis of rotary motion thereof, a counter shaft journalled in said swivel means at right angles to said centralized shaft, respective bevel gears keyed to said centralized shaft and right angular counter shaft and in mesh with one another, a variable speed belt and pulley system including individual pulleys adapted to be interchanged with one another, said system connecting said right angular counter shaft to said tool spindle, said belt and pulley system including timing belts and pulleys having interemeshing teeth providing a positive driving connection for rotating the spindle at selected speeds, and a power motor mounted on the overarm and in driving connection with said centralized shaft, said bevel gears providing rotary motion of said swivel means, right angular counter shaft and spindle housing as a unit about said axis relative to said driving motor for selectively rotating the spindle housing and tool spindle about said axis relative to the overarm.

2. A milling head structure for a milling machine having an overarm, said head structure comprising, a spindle housing, a tool spindle journalled in said housing, swivel means connecting said spindle housing to said overarm for rotary indexing motion of the housing about an axis generally at right angles to the axis of the spindle, a centralized drive shaft journalled in said swivel means, said drive shaft residing on said axis with rotary indexing motion of the spindle housing, a variable speed belt and pulley system including individual pulleys adapted to be interchanged with one another, said belt and pulley system connecting said centralized shaft to said spindle, said variable belt and pulley driving system rotating the spindle at selected speeds, a power motor, shiftable motor mounting means supporting said motor on said overarm, said motor having a drive shaft generally parallel with said centralized drive shaft, manual control means connected to said shiftable means for moving said motor laterally toward or away from said centralized drive shaft, a stepped driving pulley mounted on said motor, a stepped driven pulley mounted on said centralized shaft, and a driving belt tracked upon said driving and driven pulleys, said shiftable motor mounting means providing clearance for shifting the belt relative to said stepped pulleys for changing the speed ratio of the stepped pulley system, thereby providing selective spindle speeds, said centralized drive shaft driving said spindle at the selected spindle speed with the spindle housing indexed to selected angles relative to the overarm.

3. A milling head structure for a milling machine having an overarm, said head structure comprising, a spindle housing, a tool spindle journalled in said housing, swivel means extending from said housing generally at right angles to the axis of the spindle and journalled in said overarm for rotary indexing motion of the spindle housing, a centralized drive shaft journalled in said swivel means, said drive shaft residing on the axis of rotary indexing motion of the spindle housing, a power motor mounted on the overarm and in driving connection with the centralized shaft, a right angular counter shaft in driving connection with the centralized drive shaft, said shaft journalled in said swivel means, an idler shaft mounted on said swivel means parallel with the counter shaft and spaced laterally therefrom, a drive pulley on said counter shaft, a driven pulley journalled on the idler shaft, an intermediate belt tracked upon said pulleys and driving the said driven pulley, a spindle drive pulley on said idler shaft in driving connection with the driven pulley thereof, companion spindle drive pulley keyed on said spindle, a drive belt tracked upon the said spindle driving pulleys, said spindle drive pulley of the idler shaft and companion spindle drive pulley of the spindle having different pitch diameters, said pulleys adapted to be interchangeably mounted on the spindle and on the idler shaft to provide two selective speed ranges, and a speed change driving system connecting said power motor to said centralized drive shaft, and manual means for shifting the said speed change driving system, said system providing selective spindle speeds in combination with said two selective speed ranges, said centralized drive shaft driving the spindle at said selected speeds with the spindle housing and spindle indexed at selected angles relative to the overarm.

4. A milling head structure for a milling machine having an overarm, said milling head comprising, a spindle housing, a tool spindle journalled in said housing, swivel means extending from said housing on an axis generally at right angles to the axis of the spindle, said swivel means journalled in the overarm and providing a rotary indexing motion of the spindle housing, a centralized drive shaft journalled in said swivel means upon the turning axis thereof, a counter shaft journaled in said swivel means and residing generally at right angles to said centralized shaft and parallel with the spindle, a power motor on the overarm in driving connection with the centralized shaft, respective bevel gears on the centralized shaft and counter shaft meshing with one another and driving the counter shaft, a pulley keyed to said counter shaft, a shiftable sector element mounted for pivotal motion about the axis of the right angular counter shaft, an idler shaft mounted on a swinging portion of said sector element and residing parallel with the counter shaft, a drive pulley keyed to the counter shaft, a driven pulley journalled on the said idler shaft, a belt tracked on said pulleys and driving the driven pulley, a set of stepped drive pulleys journalled in the idler shaft and in driving connection with the driven pulley thereof, a set of stepped driven pulleys keyed on said spindle, the individual pulleys of each of said sets having different pitch diameters and residing in common planes, a spindle driving belt adapted to be tracked upon individual pulleys of each set which reside in a common plane, said sector element, idler shaft, and pulleys thereof movable as a unit in an arc relative to the spindle, whereby said spindle driving belt is shiftable into tracking engagement with selective individual pulleys of said sets to provide a plurality of spindle speed ranges, said centralized drive shaft providing rotary indexing motion of the swivel means and driving the tool spindle at said selected speed ranges at selected indexed angles of the spindle housing and spindle.

5. A milling head structure for a milling machine having an overarm, said milling head comprising, a spindle housing, a tool spindle journalled in said housing, a swivel spool extending from said housing on an axis generally at right angles to the axis of the spindle, said swivel spool journalled in the overarm and providing a rotary indexing motion of the spindle housing, said swivel spool having a cylindrical bearing sleeve disposed at right angles to the axis of the spool, a centralized drive shaft journalled in said swivel spool upon the turning axis thereof, a counter shaft journalled in the said bearing sleeve of the swivel spool and residing generally at right angles to said centralized shaft and parallel with the spindle, a power motor on the overarm in driving connection with the centralized shaft, respective bevel gears on the centralized shaft and counter shaft meshing with one another and driving the counter shaft, a pulley keyed to said counter shaft, a shiftable sector mounted externally upon the cylindrical bearing sleeve of the swivel spool for pivotal motion about the axis of the right angular counter shaft, an idler shaft mounted on a swinging portion of said sector and residing parallel with the counter shaft, a drive pulley keyed to the counter shaft, a driven pulley journalled on the said idler shaft, a belt tracked on said pulleys and driving the driven pulley, a set of stepped drive pulleys journalled in the idler shaft, and in driving connection with the driven pulley thereof, a set of stepped driven pulley keyed on said spindle, the individual pulleys of each of said sets having different pitch diameters and residing in common planes, a spindle driving belt adapted to be tracked upon individual pulleys of each set which reside in a common plane, said sector, idler shaft, and pulleys thereof movable as a unit in an arc relative to the spindle, whereby said spindle driving belt is shiftable into tracking engagement with selective individual pulleys of said sets to provide a plurality of spindle speed ranges, said centralized drive shaft providing rotary indexing motion of the swivel means and driving the tool spindle at said selective speed ranges at selected indexed angles of the spindle housing and spindle.

6. A milling head structure for a milling machine having an overarm, said milling head comprising, a spindle housing, a tool spindle journalled in said housing, swivel means extending from said housing on an axis generally at right angles to the axis of the spindle, said swivel means journalled in the overarm and providing a rotary indexing motion of the spindle housing, a centralized drive shaft journalled in said swivel means upon the turning axis thereof, a counter shaft journalled in said swivel means and residing generally at right angles to said centralized shaft and parallel with the spindle, respective bevel gears on the centralized shaft and counter shaft meshing with one another and driving the counter shaft, a shiftable sector element mounted for pivotal motion about the axis of the right angular counter shaft, an idler shaft mounted on the swinging portion of said sector element and parallel with the counter shaft, a drive pulley keyed to the counter shaft, a driven pulley journalled on the said idler shaft, a belt tracked on said pulleys and driving the driven pulley, a set of stepped drive pulleys journalled in the idler shaft and in driving connection with the driven pulley thereof, a set of stepped pulleys keyed on said spindle, the individual pulleys of each of said sets having different pitch diameters, a spindle, driving belt tracked upon selected individual pulleys of each set, said sector element, idler shaft and pulleys thereof shiftable about the counter shaft as a unit in an arc relative to the spindle, whereby said spindle driving belt is shiftable into tracking engagement with selective individual pulleys of said sets to provide a plurality of spindle speed ranges, a power motor mounted on the overarm, a set of stepped drive pulleys on said motor, a set of stepped driven pulleys keyed to said centralized shaft, and a driving belt tracked upon said driving and driven pulleys, said belt being shiftable relative to said pulleys, thereby to provide a series of selective driving ratios from said motor to said centralized shaft, said selective driving ratios combining with the said selective speed ranges and providing selective individual spindle speed rates.

References Cited in the file of this patent

UNITED STATES PATENTS

| | | |
|---|---|---|
| 1,746,265 | Klausmeyer | Feb. 11, 1930 |
| 1,976,107 | Archea | Oct. 9, 1934 |
| 1,993,742 | Klausmeyer et al. | Mar. 12, 1935 |
| 2,304,779 | Curtis | Dec. 15, 1942 |
| 2,349,199 | Richards | May 16, 1944 |
| 2,404,561 | Bannow | July 23, 1946 |
| 2,473,963 | McKelvey | June 21, 1949 |
| 2,491,940 | Tree | Dec. 20, 1949 |
| 2,618,202 | Eserkaln | Nov. 18, 1952 |
| 2,657,616 | Armitage et al. | Nov. 3, 1953 |

FOREIGN PATENTS

| | | |
|---|---|---|
| 12,392 | Great Britain | 1902 |